(12) United States Patent
Henslee et al.

(10) Patent No.: US 11,125,663 B1
(45) Date of Patent: Sep. 21, 2021

(54) CRYOGENIC SYSTEMS AND METHODS

(71) Applicant: Montana Instruments Corporation, Bozeman, MT (US)

(72) Inventors: Isaac Henslee, Bozeman, MT (US); Ben Linkenhoker, Bozeman, MT (US); Caleb Schreibeis, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 0 days.

(21) Appl. No.: 15/457,883

(22) Filed: Mar. 13, 2017

Related U.S. Application Data (60) Provisional application No. 62/307,288, filed on Mar. 11, 2016.

(51) Int. Cl.
| | |
|---|---|
| F25B 9/14 | (2006.01) |
| G01N 1/42 | (2006.01) |
| G01N 21/01 | (2006.01) |
| G02B 21/28 | (2006.01) |
| G02B 21/26 | (2006.01) |

(52) U.S. Cl.
CPC ............ *G01N 1/42* (2013.01); *G01N 21/01* (2013.01); *G02B 21/26* (2013.01); *G02B 21/28* (2013.01); *G01N 2201/02* (2013.01)

(58) Field of Classification Search
CPC ............ F25B 9/14; F25D 19/006; G01N 1/42
See application file for complete search history.

(56) References Cited

U.S. PATENT DOCUMENTS

| | | | |
|---|---|---|---|
| 3,444,365 A | 5/1969 | Loebe | |
| 3,894,403 A | 7/1975 | Longsworth | |
| 3,929,516 A | 12/1975 | Cheskis et al. | |
| 4,161,747 A | 7/1979 | Jennings | |
| 4,745,761 A | 5/1988 | Bazaj et al. | |
| 4,854,131 A | 8/1989 | Sakitani et al. | |
| 4,869,068 A | 9/1989 | Van Vloten | |
| 4,968,663 A | 11/1990 | Whang | |
| 5,129,232 A | 7/1992 | Minas et al. | |

(Continued)

FOREIGN PATENT DOCUMENTS

| | | |
|---|---|---|
| CN | 103901232 | 7/2014 |
| EP | 0619440 | 10/1994 |

(Continued)

OTHER PUBLICATIONS

Mueller Copper 1100 (Electrolytic Tough Pitch Copper), Alloy Digest, 1983, 2 pages.

(Continued)

*Primary Examiner* — Brian M King
(74) *Attorney, Agent, or Firm* — Wells St. John P.S.

(57) ABSTRACT

Cryogenic analysis systems are provided that can include: at least one sample stage operatively aligned with at least one cooling source; at least one thermal link operationally coupled between the sample stage and the cooling source; and at least one link support between the cooling source and the sample stage, the link support engaging the thermal link. Methods for cooling a sample within a cryogenic analysis system are provided with at least some of the methods including: thermally connecting a cooling source to a sample stage supporting a sample via a thermal link; and supporting the thermal link between the cooling source and the sample stage.

18 Claims, 8 Drawing Sheets

(56) References Cited

U.S. PATENT DOCUMENTS

| | | | |
|---|---|---|---|
| 5,327,733 A | 7/1994 | Boolchand et al. | |
| 5,349,823 A | 9/1994 | Solomon | |
| 5,410,910 A | 5/1995 | Somlyo et al. | |
| 5,552,608 A * | 9/1996 | Gallagher | F17C 3/085 |
| | | | 250/352 |
| 5,613,367 A | 3/1997 | Chen | |
| 5,628,195 A | 5/1997 | Hill et al. | |
| 5,737,927 A | 4/1998 | Takahashi et al. | |
| 5,749,243 A | 5/1998 | Lester | |
| 5,889,456 A | 3/1999 | Triebe et al. | |
| 6,005,964 A | 12/1999 | Reid et al. | |
| 6,196,005 B1 | 3/2001 | Stautner | |
| 7,430,871 B2 | 10/2008 | Strobel | |
| 7,628,536 B2 | 12/2009 | Umemura | |
| 7,932,733 B2 | 4/2011 | Sasajima et al. | |
| 8,114,321 B2 | 2/2012 | Johnson | |
| 8,746,008 B1 * | 6/2014 | Mauritsen | F25B 1/10 |
| | | | 62/510 |
| 8,756,941 B2 | 6/2014 | Snow et al. | |
| 9,134,047 B2 | 9/2015 | Black et al. | |
| 9,303,914 B2 | 4/2016 | Mauritsen et al. | |
| 9,821,421 B2 | 11/2017 | Mauritsen et al. | |
| 2005/0140959 A1 | 6/2005 | Tsuji et al. | |
| 2005/0126187 A1 | 8/2005 | Li et al. | |
| 2005/0204748 A1 | 9/2005 | Yamanaka et al. | |
| 2006/0148276 A1 | 7/2006 | Renaudin | |
| 2007/0234751 A1 | 10/2007 | Nagamune | |
| 2007/0278719 A1 | 12/2007 | Adachi et al. | |
| 2009/0224788 A1 | 9/2009 | Sasajima et al. | |
| 2009/0272127 A1 | 11/2009 | Radovinsky et al. | |
| 2010/0050661 A1 * | 3/2010 | Snow | F25B 9/14 |
| | | | 62/51.1 |
| 2014/0007596 A1 | 1/2014 | Prester et al. | |
| 2014/0130520 A1 | 5/2014 | Snow et al. | |
| 2014/0248649 A1 | 9/2014 | Mayer et al. | |
| 2015/0248002 A1 | 9/2015 | Ingersoll et al. | |
| 2015/0252799 A1 | 9/2015 | Roscher | |
| 2015/0323626 A1 | 11/2015 | Jonas et al. | |
| 2015/0338151 A1 | 11/2015 | Miki | |
| 2017/0168121 A1 * | 6/2017 | Yu | A61B 5/05 |
| 2017/0261413 A1 | 9/2017 | Schreibeis et al. | |
| 2017/0323764 A1 * | 11/2017 | Muto | H01J 27/26 |
| 2019/0025166 A1 | 1/2019 | Schreibeis et al. | |
| 2019/0170621 A1 | 6/2019 | Doherty et al. | |

FOREIGN PATENT DOCUMENTS

| | | |
|---|---|---|
| JP | 05059503 A | 3/1993 |
| JP | H05-341487 A | 12/1994 |
| WO | PCT/US2019/55449 | 1/2020 |
| WO | PCT/US2019/55449 | 4/2021 |

OTHER PUBLICATIONS

Snow, U.S. Appl. No. 61/136,138, filed Aug. 14, 2008, titled "Apparatus(es) & Methods for Improving Vibration Isolation, Thermal Dampening, Optical Access in Cryogenic Refrigerators", 18 pages.

White, G.K., "The Thermal and Electrical Conductivity of Copper at Low Temperatures", 1953, pp. 398-404.

Majorana et al., "Vibration Free Cryostat for cooling suspended mirrors", Journal of Physics: Conference Series 32, (2006), pp. 374-379.

* cited by examiner

CRYOGENIC SYSTEMS AND METHODS

CROSS REFERENCE TO RELATED APPLICATION

This application claims priority to U.S. provisional patent application Ser. No. 62/307,288 which was filed Mar. 11, 2016, entitled "Cryogenic Systems and Methods", the entirety of which is incorporated by reference herein.

TECHNICAL FIELD

The present disclosure relates to cryogenic systems and methods. Particular embodiments of the disclosure relate to sample stage configurations in cryogenic systems and methods of staging samples.

BACKGROUND

The present invention relates to systems and methods for cryogenic research. More particularly, the present invention relates to systems and methods for microscopy and spectroscopy of cryocooled samples.

Problems associated with low temperature microscopy are many. The cooling systems cause sample vibration; maintaining a constant temperature of the sample is likewise a challenge. There have been attempts to address these problems, yet no solution provides a reliable system that supports a sample without vibration and maintaining sample temperature.

A need remains for a system that effectively isolates a cryocooled sample from vibration of the cooling system while maintaining the sample at a steady temperature.

SUMMARY OF THE DISCLOSURE

Cryogenic analysis systems are provided that can include: at least one sample stage operatively aligned with at least one cooling source; at least one thermal link operationally coupled between the sample stage and the cooling source; and at least one link support between the cooling source and the sample stage, the link support engaging the thermal link.

Methods for cooling a sample within a cryogenic analysis system are provided with at least some of the methods including: thermally connecting a cooling source to a sample stage supporting a sample via a thermal link; and supporting the thermal link between the cooling source and the sample stage.

DRAWINGS

Features disclosed herein are referenced in the accompanying drawings which illustrate embodiments of the disclosure.

DESCRIPTION

This disclosure is submitted in furtherance of the constitutional purposes of the U.S. Patent Laws "to promote the progress of science and useful arts" (Article 1, Section 8).

Figure 1:
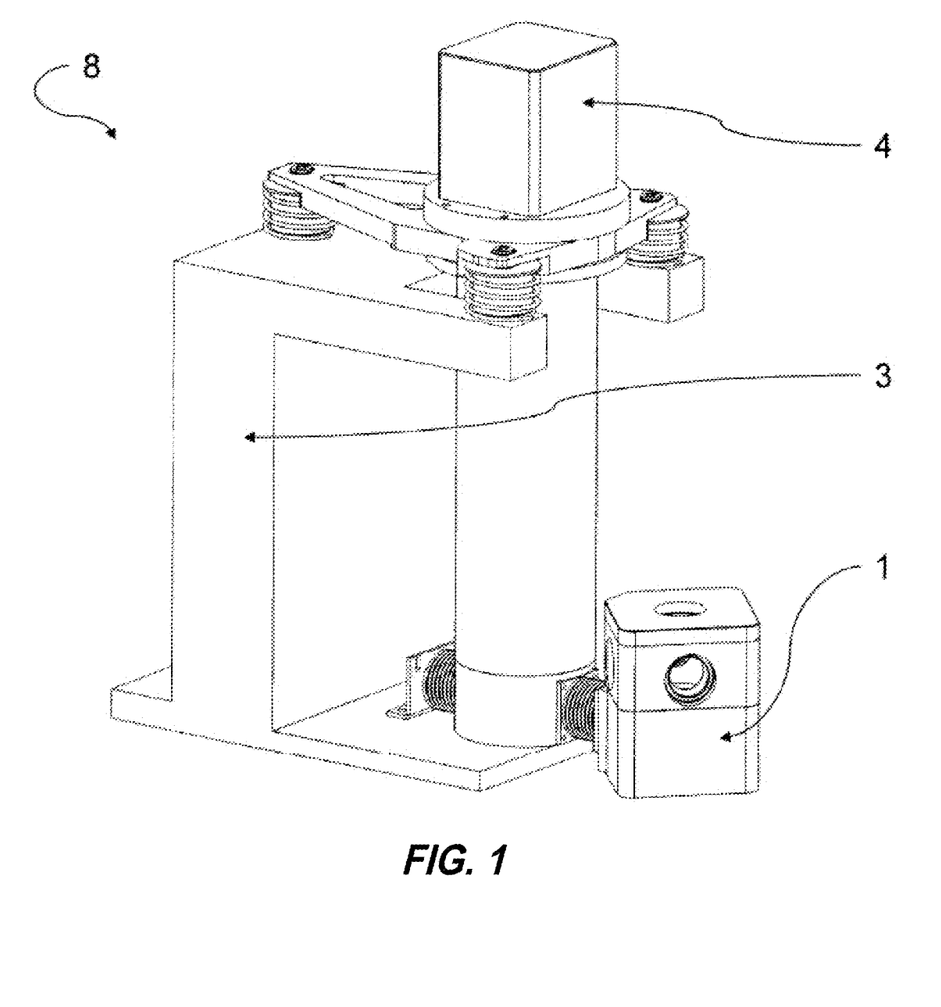
FIG. 1 is a side perspective view of an exemplary cryogenic system.

Embodiments of the present disclosure will be described with reference to FIGS. 1-9. Referring first to FIG. 1, an exemplary cryogenic system 8 is depicted. Cryogenic system 8 can be generally configured as described in U.S. Pat. No. 8,746,008 to Mauritsen et al. and entitled, "Low Vibration Cryocooled System for Low Temperature Microscopy and Spectroscopy Applications", the entirety of which is incorporated by reference herein.

Cryogenic system 8 can include a support 3 which supports a closed-cycle cryocooler expander unit 4 which can be operatively aligned with sample housing 1. Unit 4 can be a Sumitomo Heavy Industries RDK-101D cryocooler.

Figure 2:
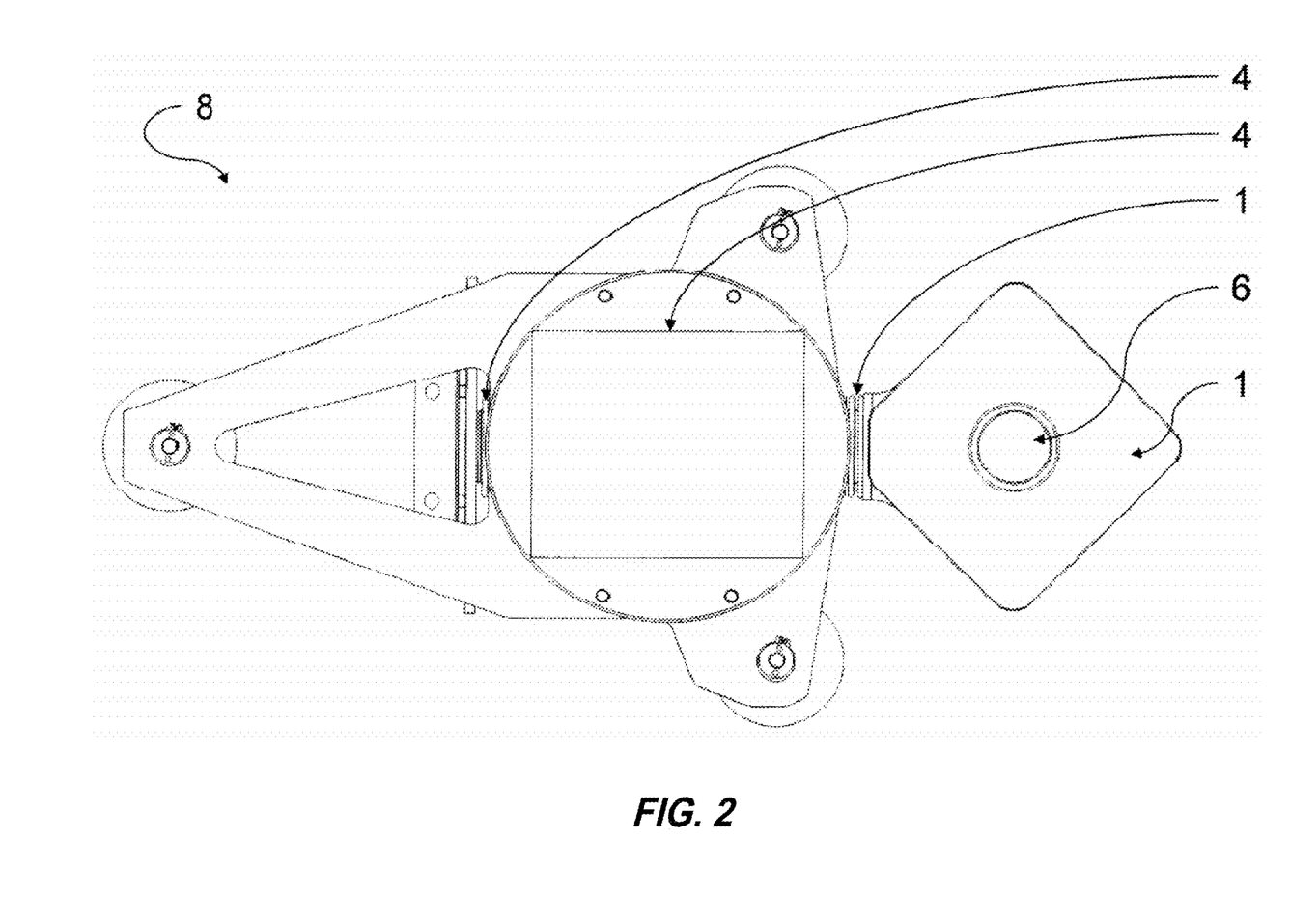
FIG. 2 is a top plan view of the cryogenic system of FIG. 1 according to an embodiment of the disclosure.
Figure 3:
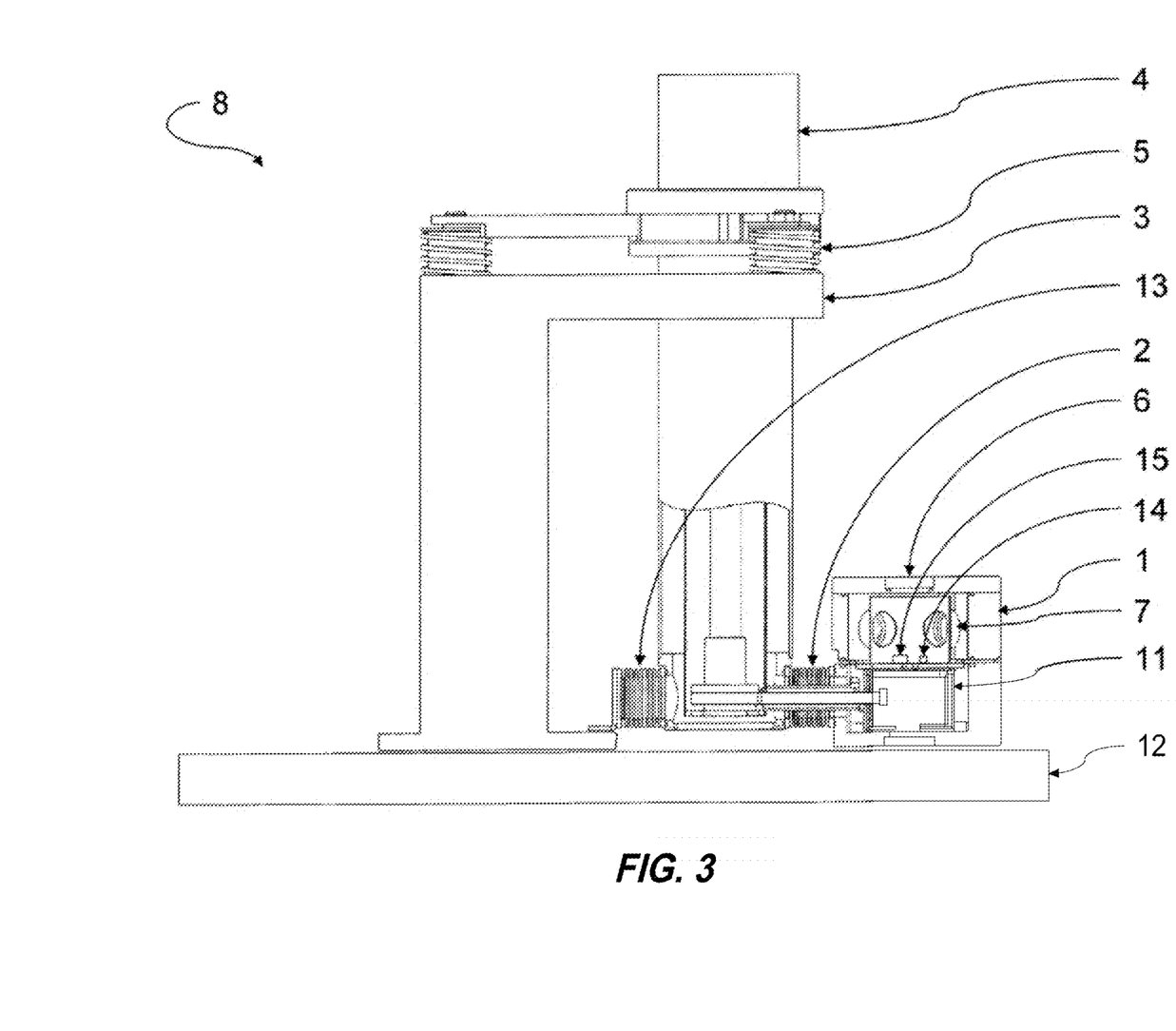
FIG. 3 is a side elevational cutaway view of the cryogenic system of FIG. 1 according to an embodiment of the disclosure.

Referring next to FIGS. 2 and 3, spring dampers 5 may be operatively aligned between unit 4 and support 3. Unit 4 can be connected to sample housing 1 and cryogenic system sample support component 11 by bellows 2. The diameter of bellows 2 can be in the range from about 0.75 inches to about 3 inches and is more preferably in the range from about 1 inch to about 1.25 inches.

In normal use, both rigid support 3 and sample housing 1 rest on an optical bench 12 or on another rigid plane. In a more preferred embodiment, optical bench 12 can be a Newport air isolated table. Optical access to the cryocooled sample inside the sample housing 1 is through the top optical access port 6 and/or through the side access ports 7. The sample is preferably supported by a rigid cryogenic system sample support component 11 which holds the sample in a fixed location relative to the optical bench 12 or rigid plane on which the invention rests. The cryocooler also can be attached to the support component 11 by a separate flexible hermetic sealing bellows 13 that is in alignment with flexible vacuum bellows 2. A temperature sensor 14 and a heater 15 may be located on the cryogenic system sample support component 11 near the sample to allow for an adaptive feedback loop to reduce temperature fluctuations. In at least one embodiment, the temperature sensor is a Cernox temperature sensor from Lakeshore Cryogenics Inc.

In more detail, system 8 allows a sample to be cryogenically cooled and rigidly mounted to the optics bench 12 and aligned separately (situated a distance away) from the axis of the cryocooler expander unit 4 such that top access to the sample housing 1 via top access port 6 may be achieved. This unique configuration in which the sample is located off axis from and a distance away from the cryocooler expander unit 4 reduces sample vibration by isolating the sample. The pair of flexible vacuum bellows 2 and 13 which connect the cryocooler expander unit 4 to the sample housing 1 and to the rigid support 3 are preferably aligned along a common axis and opposed to one another such that when there is a differential pressure on the inner and outer surfaces of the bellows 2, there is no net force imposed on the cryocooler expander unit 4.

In accordance with example implementations, system 8 can be configured to include a temperature sensor 14 and a heater 15 located near the sample on the cryogenic system sample support component 11 such that temperature can be read by an electronic device for data acquisition.

Specifically, the cryocooler is operated manually until the cryogenic system sample support component 11 has reached a stable temperature near the desired measurement temperature as measured by the temperature sensor 14. At that time the temperature profile of at least one cycle of the cryocooler is recorded. Based on this initial, uncontrolled temperature profile, a profile of heater values which is inversely proportional to the recorded temperature profile is applied using heater 15 synchronously with the cryocooler cycle and adjusted for phase relative to the cryocooler cycle to optimize the temperature minimization.

A second phase of optimization of the heater profile can be obtained by measuring the residual cyclical temperature variation of each value of the heater profile with sensor 14. A correction factor to each value of the heater profile is applied using heater 15 that is proportional to each measured residual value.

A laser, optics, and a microscope may be used with system 8 to interrogate and observe a cooled sample, all of which are supported by a common optics bench. Operation of the system can include cooling the cryocooler expander unit 4 to cryogenic temperatures and using the optical apertures 6 and/or 7 for observation of the sample using microscopes or other imaging devices and interrogation of the sample using lasers or other electromagnetic energy propagation devices along with detection of signals returned by the interrogated sample.

Many variations of the disclosure will occur to those skilled in the art. Some variations include an inverted cryocooler expander unit 4 such that it would be located underneath the optics bench 12 and extend up through a hole in the optics bench, or extend up over the edge of the optics bench 12. Other variations call for the cryocooler expander unit 4 being supported by structure separate from the optics bench 12 where the sample housing 1 is located. Additionally, the environment surrounding the sample may be altered or changed by adding a magnetic field, high pressure, RF field, or other types of environmental alterations. All such variations are intended to be within the scope of this disclosure.

Although some embodiments are shown to include certain features, the applicant specifically contemplates that any feature disclosed herein may be used together or in combination with any other feature on any embodiment of the invention. It is also contemplated that any feature may be specifically excluded from any embodiment of the invention.

One of the difficulties with using a closed-cycle cryogenic system is preventing the mechanical energy generated by the cold head (cooling source) from being transmitted to the sample. Energy from the continuous running of the cryogenic system itself is introduced into the environment near the cryogenic system. Once a thermal connection is made from the cold finger to the sample environment, such as an independent support, mechanical energy will be transmitted to the sample which leads to vibrations of sample.

One technique to prevent this from happening is to create very soft thermal connections from the cold head to the sample environments as an attempt of passive isolation from noise source. The present disclosure provides a much more effective way to rid the sample environment of unwanted mechanical energy by adding multiple stage supports to the thermal pathway between the sample and cold head. By adding a rigid mechanical filter, firmly attached to the optical table, between the cold head and sample environment, one can transmit a large percentage of mechanical energy into the optical table before it can enter the sample environment and create vibrations or unwanted displacements. The thermal connections between the cold head and sample environment, optimized for low stiffness and high cooling power, are then attached from the cold finger to the thermal path support, then to the sample environment. The thermal path support may also be optimized to be very stiff and have a very high thermal resistance.

Additionally, with a multi-staged thermal path support the effectiveness of the thermal path can be increased (meaning either conduction path increased, fluid pipe diameter increased), between the sample support and the cold head without proportionally increasing the energy, such as the mechanical energy, transferred between the sample support and cold head. So, by including a thermal path support into the design of a cryogenic system, the overall mechanical energy transmitted to the sample from the cold head can be reduced while at the same time increasing the thermal path cooling power. Clearly tradeoffs can be made to reduce one more than the other, but in either scenario, the multi-stage thermal path support can significantly enhance the overall performance of a closed cycle, low vibration cryogenic system.

Figure 4:
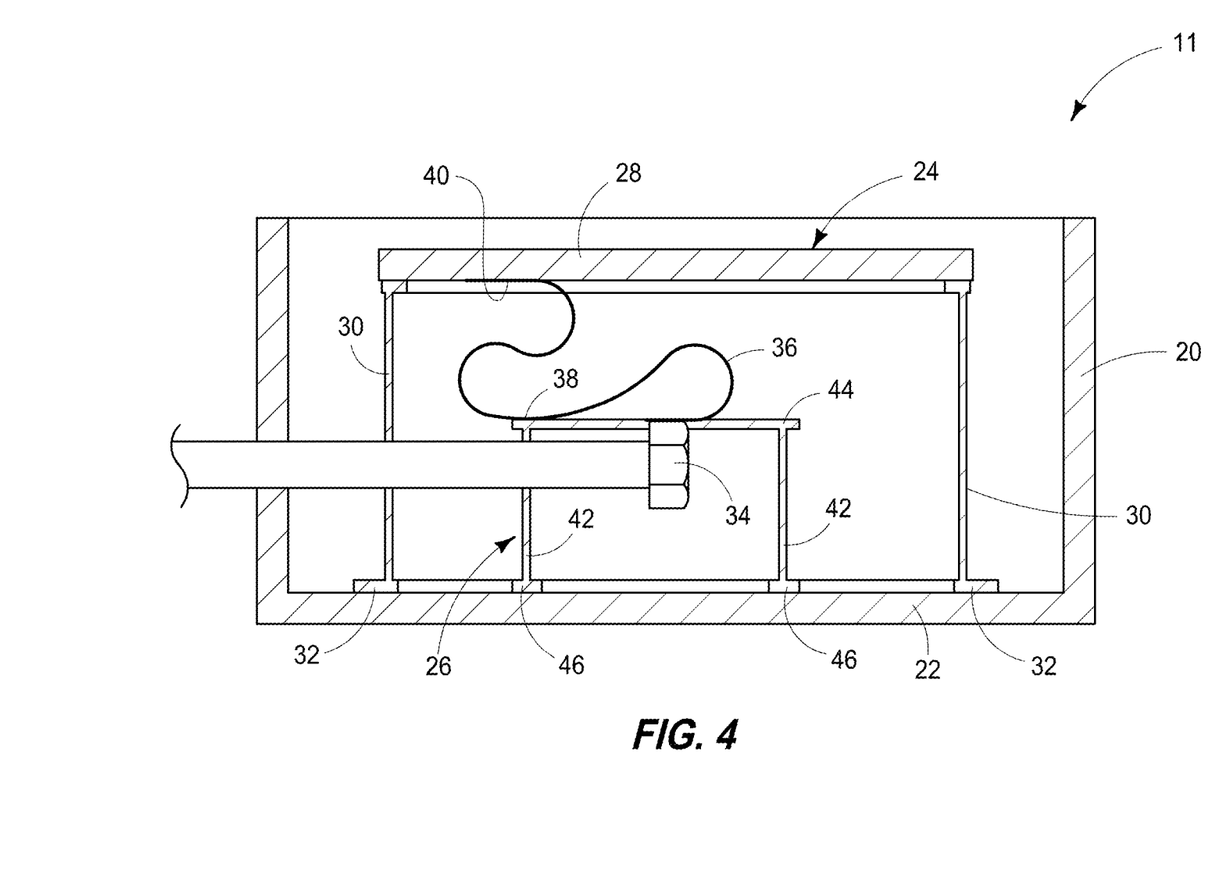
FIG. 4 is a sample support component according to an embodiment of the disclosure.

Referring next to FIG. 4, sample support component 11 is depicted. As described component 11 is a component of a cryogenic analysis system. As indicated herein, component 11 can be configured to operatively couple and/or or be a component of system 8, for example. In accordance with example implementations, this component can be configured to operatively couple with other systems as well.

Component 11 can include a housing 20 and a base 22. Within housing 20 can be a sample support structure 24. Structure 24 can include a sample support 28 supported by walls 30 that extent to base 32. As is shown, bases 22 and 32 are in thermal contact with one another. Walls 30 can be substantially thin in comparison with housing 20, thus providing a substantial reduction in thermal conduction between base 32 and support 28. Structure 24, support 28, walls 30, and/or base 32 can form all or part of a sample stage.

Within housing 20 can also be another support 26, such as a link support. Support 26 can include walls 42 extending between footings 46 and flanges 44. Support 26 can be configured as a topless structure wherein an opening exists between cold head 34 (cooling source) and support 28. Accordingly, the sample stage can be operatively aligned with at least one cooling source.

In accordance with example implementations, support 26 can be configured as a cylinder with walls 42 being substantially thinner than footings 46 and/or flanges 44. These walls can be constructed of metal and/or organic composite materials such as fiberglass and/or combinations of both.

In at least one example configuration, thermal link 36 can extend between head 34 and support 28 connecting to the cold head then to support 26 at, for example, flange portion 44, then on to support 28 at connection point 40. Link 36 can be a single complete link, it may be a link in pieces connecting between head 34 and support 28 then another link connecting between support 28 and point 40. Link 36 may be multiple links, each extending in parallel from head 34 to support 28 and then to point 40. Link 36 may be a very pliable or soft link, or link 36 may be a very rigid or stiff link.

Link 36 can be a thin metallic strip, copper for example, perhaps annealed, and/or a bundle of strips. Link 36 can also be a conduit that is configured to provide a fluid, such as helium, to the support. This conduit and/or the link connection at point 40 can traverse the support multiple times in a looping fashion if desired.

Figure 5:
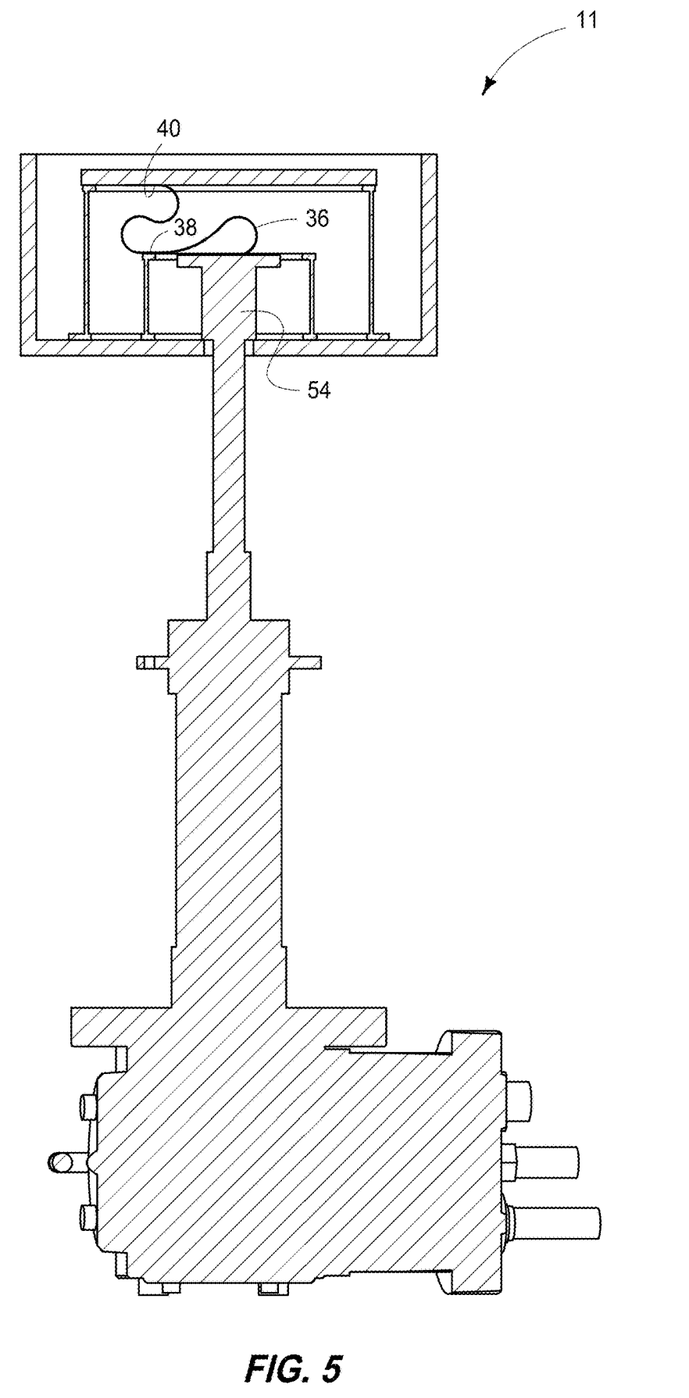
FIG. 5 is another sample support component according to another embodiment of the disclosure.
Figure 6:
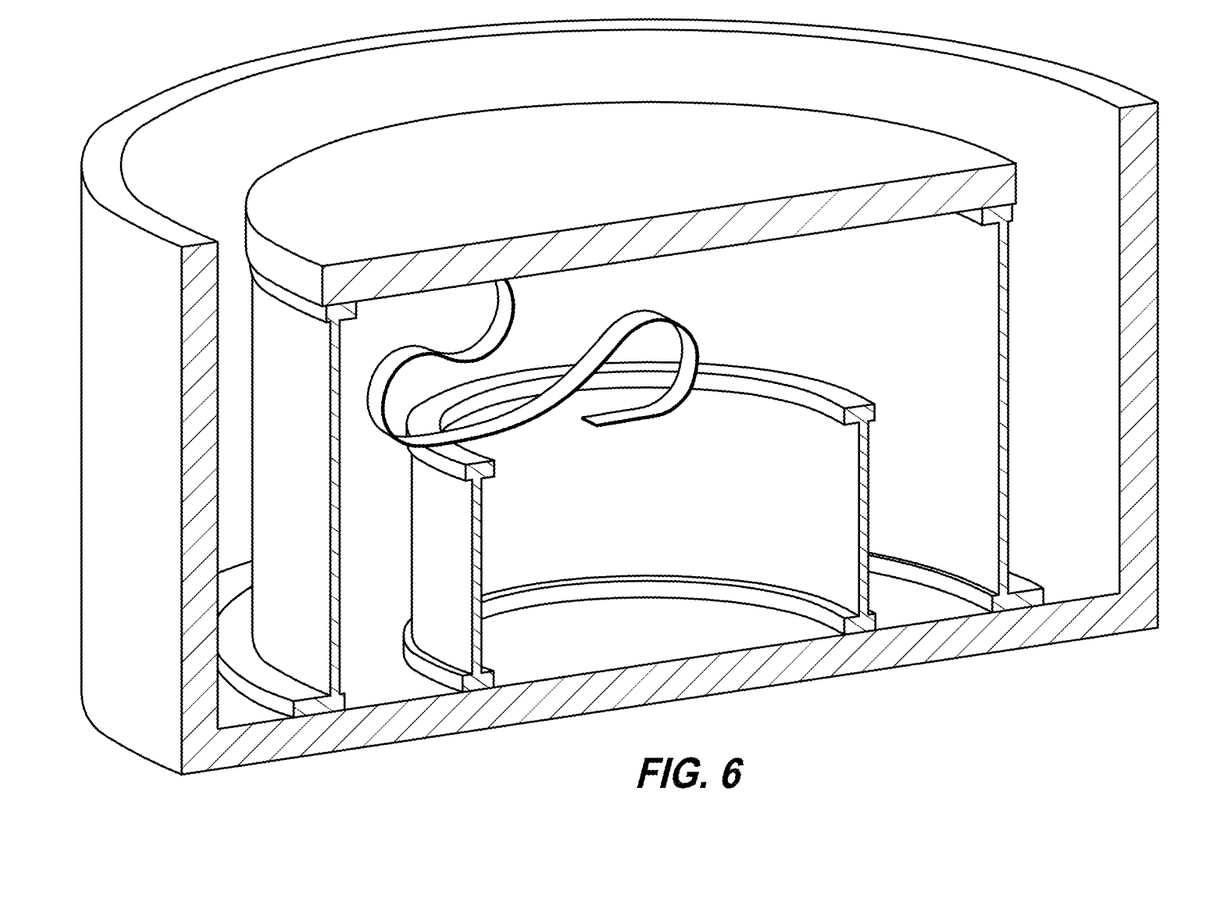
FIG. 6 is a perspective view of the sample support component of FIG. 4 according to an embodiment of the disclosure.

Referring next to FIG. 5, another configuration of component 11 is shown having cold head 54 provided from an alternative cryogenic system assembly. Referring to FIG. 6, a perspective view of component 11 is shown. Accordingly, the sample stage and at least part of the cooling source is enclosed within a housing maintained under vacuum sufficient for cryogenic sample analysis. As depicted, the cooling source can be aligned below the sample stage. Further, the link support can be lateral of the cooling source and below the sample stage. Base 22 can support both link support 26 and the sample stage.

Figure 7:
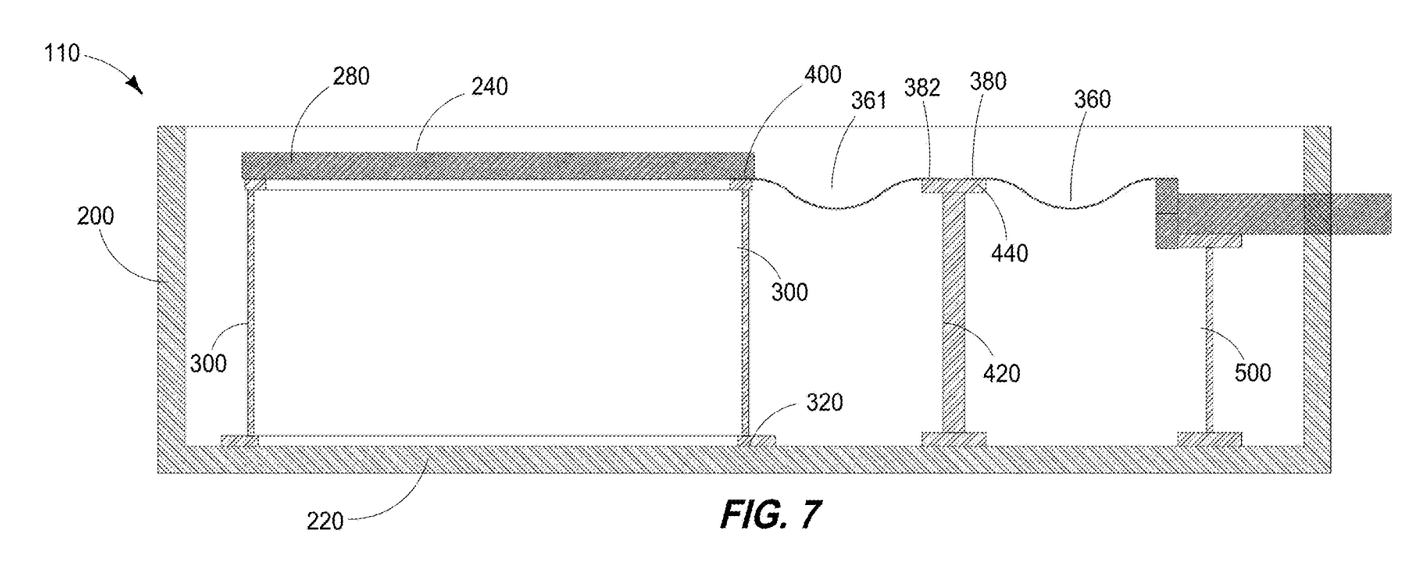
FIG. 7 is a view of at least one cross section of a portion of a cryogenic analytical system according to an embodiment of the disclosure.
Figure 8:
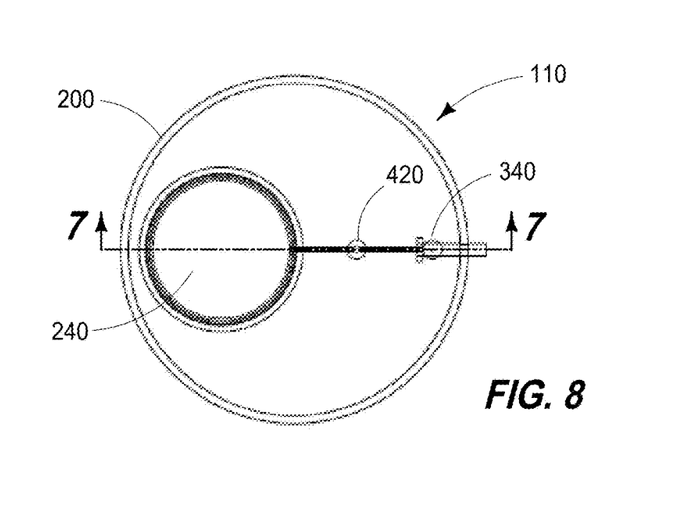
FIG. 8 is a top view of the portion of the cryogenic analytical system of FIG. 7 according to an embodiment of the disclosure.
Figure 9:
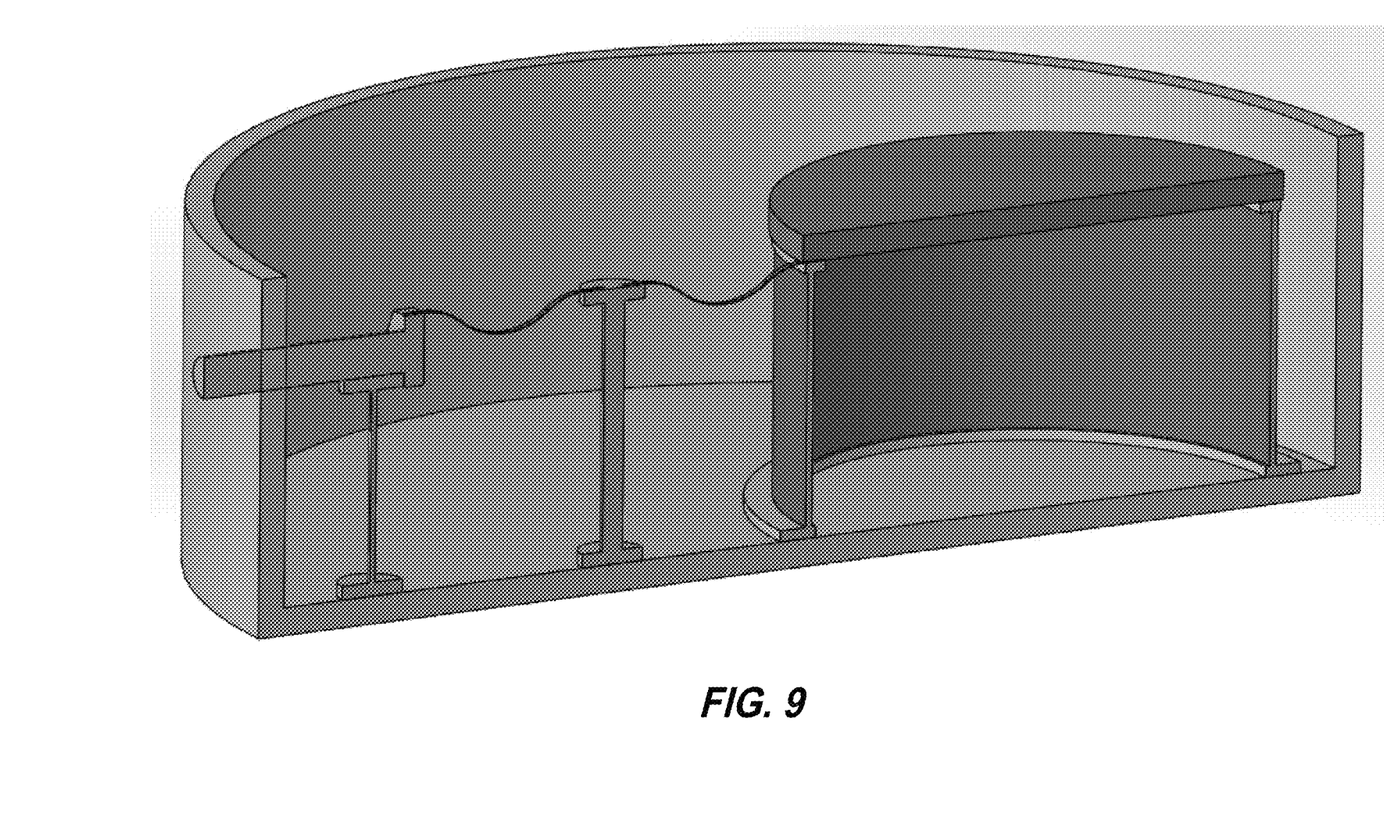
FIG. 9 is a perspective view of the portion of the cryogenic analytical system of FIGS. 7 and 8 according to an embodiment of the disclosure.

Referring next to FIGS. 7-9, another embodiment of a cryogenic analysis system is shown having a component 110. Component 110 can include a housing 200 that is supported by a base 220. Like component 11, component 110 can be configured to maintain a vacuum sufficient for cryogenic analysis. Sample platform 240 includes structure 280 supported by walls 300 to form part or all of a sample stage. Support 420 is between or lateral to the sample stage and cold head 340. As can be seen from the Figures, links 360 and 361 are run in series connecting head 340 to support 420 at connection 440 and then from connection 440 to structure 240. Further, cold head 340 can be supported by structure 500. By design, structures 300, 420, and/or 500 may be constructed of insulative, but rigid materials sufficient to minimize thermal conductance, but at the same time absorb or dampen vibrations received from the cold head or links.

In accordance with example implementations, link support structures can be extended from a sidewall structure, thus extending from another portion of the assembly rather than the base. Accordingly, the support structure can address cold head vibrations along a different plan.

Each consecutive vibration isolation stage can be optimized to attenuate a specific frequency range. For example, referring to FIG. 7, where the first stage directly supports the head 34, and has minimal stiffness (thin support structure) higher frequencies can be attenuated. The second vibration isolation stage may have greater stiffness (a wider more rigid support), thus attenuating lower frequencies. Similar results can be achieved by material choice and geometry of the support structure, where a thin PTFE rod might be of low stiffness, and cylindrical fiberglass may be used for high stiffness support.

In accordance with the systems described herein, methods for cooling a sample within a cryogenic analysis system can include thermally connecting a cooling source to a sample stage supporting a sample via a thermal link, and supporting the thermal link between the cooling source and the sample stage.

The supporting can include reducing sample stage vibration amplitudes. For example, the thermal link can be connected to a radiation barrier of the sample stage, and the method can include reducing radiation shield vibration amplitudes. Further, the thermal link can be connected to a heat exchanger of the sample stage, perhaps a portion of structures 28 or 280, for example and the method can include reducing vibration amplitudes of the heat exchanger. As discussed, the thermal link can be flexible and the supporting structure can isolate high vibration amplitudes from the sample stage. Additionally, multiple supports can be nested to support one or more thermal links.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A cryogenic analysis system comprising:
    at least one sample stage operatively aligned with at least one cooling source;
    at least one flexible thermal link extending between the sample stage and the cooling source, and directly connected to both the sample stage and the cooling source, wherein the at least one flexible thermal link defines a metallic strip; and
    at least one thermally insulative link support between the cooling source and the sample stage, the thermally insulative link support directly engaging the at least one flexible thermal link at a portion of the at least one flexible thermal link between the sample stage and the cooling source.

2. The analysis system of claim 1 wherein the sample stage and at least part of the cooling source is enclosed within a housing maintained under a vacuum sufficient for cryogenic sample analysis.

3. The analysis system of claim 1 wherein the cooling source is aligned below the sample stage.

4. The analysis system of claim 3 wherein the thermally insulative link support is lateral of the cooling source and below the sample stage.

5. The analysis system of claim 4 further comprising a base of the sample stage, wherein the thermally insulative link support is supported by the base.

6. The analysis system of claim 1 wherein the cooling source is aligned lateral of the sample stage.

7. The analysis system of claim 6 further comprising a base of the sample stage, wherein the thermally insulative link support rests on the base and lateral of the sample stage.

8. The analysis system of claim 1 further comprising another thermally insulative link support between the one thermally insulative link support and the sample stage.

9. The analysis system of claim 8 wherein both thermally insulative link supports engage the at least one flexible thermal link.

10. The analysis system of claim 1 further comprising another flexible thermal link extending from the cooling source to the sample stage and engaging the thermally insulative link support.

11. A method for cooling a sample within a cryogenic analysis system, the method comprising:
    thermally connecting a cooling source to a sample stage supporting a sample via a flexible thermal link;
    directly engaging the flexible thermal link between the cooling source and the sample stage with at least one thermally insulative support; and
    wherein the flexible thermal link is connected to a radiation barrier of the sample stage.

12. The method of claim 11 wherein the supporting further comprises reducing sample stage vibration amplitudes.

13. The method of claim 11 wherein the flexible thermal link is connected to a heat exchanger of the sample stage, the method further comprising reducing vibration amplitudes of the heat exchanger.

14. The method of claim 11 further comprising a plurality of flexible thermal links and nesting multiple thermally insulative supports to support the flexible thermal links.

15. The method of claim 11 wherein the directly engaging the flexible thermal link between the cooling source and the sample stage includes directly connecting a first flexible thermal link between the cooling source and a thermally insulative link support, and directly connecting a second flexible thermal link between the thermally insulative link support and the sample stage, the first and second flexible thermal links having different conductivity configurations.

16. The method of claim 15 further comprising selecting the construction of the first and second flexible thermal links to isolate a desired frequency of mechanical vibration between the cooling source and the sample stage.

17. The method of claim 11 wherein the supporting the flexible thermal link between the cooling source and the sample stage includes arranging multiple thermally insulative supports about and/or between the cooling source and the sample stage to directly engage one or more flexible thermal links.

18. The method of claim 17 further comprising selecting the construction of one or more of the thermally insulative supports to isolate a desired frequency of mechanical vibration between the cooling source and the sample stage.

* * * * *

UNITED STATES PATENT AND TRADEMARK OFFICE
CERTIFICATE OF CORRECTION

PATENT NO. : 11,125,663 B1  
APPLICATION NO. : 15/457883  
DATED : September 21, 2021  
INVENTOR(S) : Isaac Henslee, Ben Linkenhoker and Caleb Schreibeis Page 1 of 1

It is certified that error appears in the above-identified patent and that said Letters Patent is hereby corrected as shown below:

On the Title Page

Item (56) References Cited, page 2, 2nd Column, 15th Line – Replace "JP H05-341487 A 12/1994" with --JP H06-341487 A 12/1994--

In the Specification

Column 4, Line 34 – Replace "and/or or" with --and/or--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*